Sept. 8, 1970         L. M. OSTERINK ET AL         3,527,521

ELECTRO-OPTIC OPTICAL ISOLATOR

Filed Oct. 2, 1967

INVENTORS
LARRY M. OSTERINK
PAUL J. TITTERTON

Russell A. Cannon

BY

AGENT

# United States Patent Office 3,527,521
Patented Sept. 8, 1970

3,527,521
ELECTRO-OPTIC OPTICAL ISOLATOR
Larry M. Osterink, Mountain View, and Paul J. Titterton, Palo Alto, Calif., assignors to Sylvania Electric Products Inc., a corporation of Delaware
Filed Oct. 2, 1967, Ser. No. 672,338
Int. Cl. G02f 1/26
U.S. Cl. 350—150     5 Claims

ABSTRACT OF THE DISCLOSURE

Isolation between a pair of pulsed lasers wherein light from one laser is injected into the cavity of the other laser is provided by locating a wire grid polarizer and an electro-optic modulator between them. The pulse repetition frequency of the injected light and the modulation frequency are synchronized so that the injected light is passed by the modulator without change in polarization when the modulation voltage is zero. Light from the locked laser that is traveling toward the one laser is passed by the modulator when the modulation voltage is maximum so its polarization is rotated 90° and blocked by the polarizer.

BACKGROUND OF THE INVENTION

This invention relates to isolators and more particularly to an improved technique for optically isolating a pair of pulsed lasers. (An optical isolator is defined as a device that passes light incident thereon from one direction and blocks light incident thereon from the opposite direction.)

In certain laser ranging and communication systems a pulsed light beam is required. Such a light output may, by way of example, be obtained by phase locking the laser with an intra-cavity modulator (Applied Physics Letters, volume 5, No. 1, July 1, 1964, page 4 and volume 5, No. 10, Nov. 15, 1964, page 202 and IEEE Journal of Quantum Electronics, volume QE-1, Number 6, September 1965, page 263). An intra-cavity perturbation is not normally employed in extremely high power lasers because it would be burned up by the laser beam. The output of a low power phase-locked carbon dioxide ($CO_2$) laser may, however, be injected into the cavity of a high power $CO_2$ laser through a partially transmitting mirror to produce an extremely high power pulsed light beam. It is desirable to block light from the high power laser that is traveling toward the low power laser to prevent this light from locking the low-power laser. At frequencies in the visible light spectrum Faraday optical isolators (Applied Optics, volume 3, No. 4, April 1964, page 544) are employed to isolate lasers. However, efficient optical isolators for operating at frequencies in the far infrared region are not presently available.

An object of this invention is the provision of a circuit for isolating a pair of optical networks passing light having frequencies in the infrared region.

SUMMARY OF THE INVENTION

In accordance with this invention, isolation between a first optical network producing pulses of light and a second optical network receiving and producing pulses of light is accomplished by locating a polarizer and an optical modulator between the networks. The transmission axis of the polarizer is oriented at 45° with respect to an axis of induced birefringence of the modulator. The pulse repetition frequencies of light from the networks and the spacing between the networks and the modulator is such that the light outputs of the two networks are not incident on the modulator at the same time. The pulse repetition frequency of light from the first network and the modulation frequency are synchronized so this light is passed by the modulator without a change in polarization when the modulation signal is zero. The spacing between the modulator and the second network is adjusted so light from the second network is incident on the modulator when the modulation voltage is maximum. The modulation voltage and the length and width of the modulator are adjusted so that the polarization of light from the second network is rotated 90° upon passage through the modulator and is therefore blocked from the first network by the polarizer.

BRIEF DESCRIPTION OF DRAWINGS

This invention will be more fully understood from the following detailed description of a preferred embodiment thereof, together with the following drawings wherein.

DESCRIPTION OF PREFERRED EMBODIMENT

Figure 1:
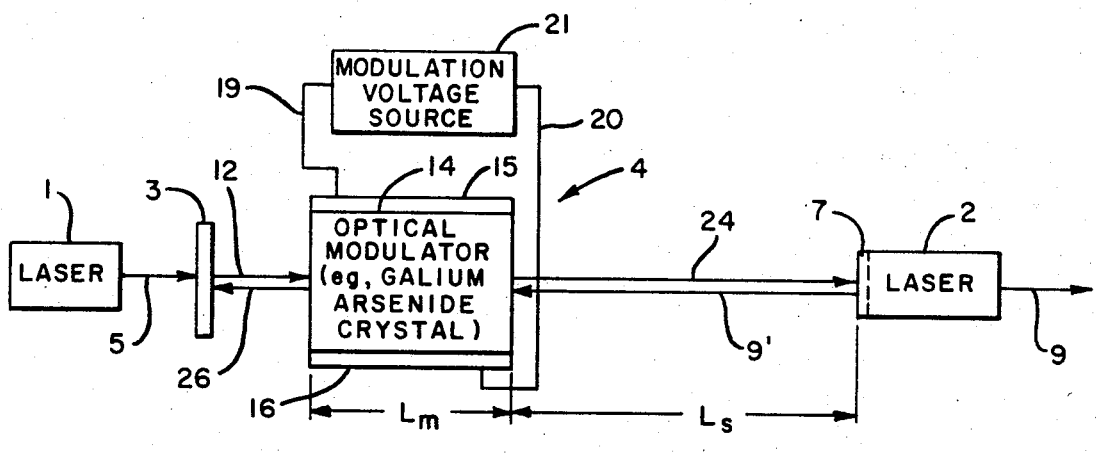
FIG. 1 is a block diagram of an optical system embodying this invention.
Figure 2:
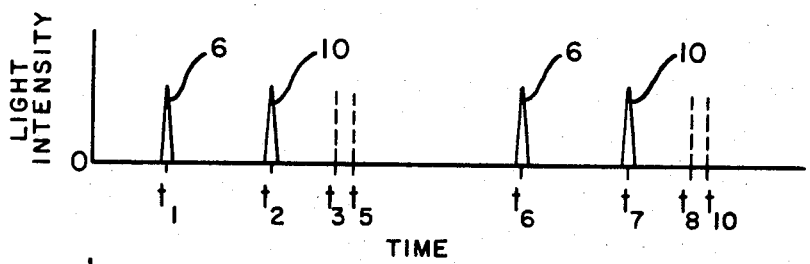
FIG. 2 is a waveform illustrating the operation of the system of FIG. 1.
Figure 4:
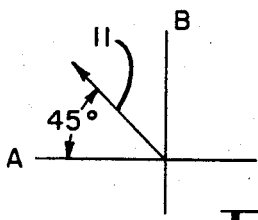
FIG. 4 is a vector diagram illustrating the operation of the invention.

Referring now to FIG. 1, a system embodying this invention comprises a pair of lasers 1 and 2, a polarizer 3 and an optical modulator 4, all of which are axially aligned. Laser 1 may, by way of example, be a low power phase-locked $CO_2$ laser. The output 5 of laser 1 comprises a train of light pulses 6 (FIG. 2). Laser 2 may, by way of example, be a high power $CO_2$ laser. The lasers are designed and adjusted to operate at the same frequency in the infrared region. The light beam from laser 1 is injected through a partially reflecting mirror 7 into the cavity (not shown) of laser 2 to cause the lasers to be phase-locked. The outputs 9 and 9' of laser 2 each comprise a train of light pulses 10 (FIG. 2). The light intensity of pulses 10 comprising output 9' is much less than the intensity of light pulses 10 comprising output 9. The pulse repetition frequencies of the pulse trains comprising light beams 5, 9 and 9' are equal. Associated pulses 6 and 10 are offset in time, however, by the time $T = t_2 - t_1$ (FIG. 2). The pulses may, by way of example, have a pulse width of approximately 1.0 nanosecond and a pulse recurrence interval (FIG. 2, time interval $t_1$ to $t_8$) of approximately 20 nanoseconds. Light comprising output 5 of laser 1 is linearly polarized at 45° with respect to the A and B reference axes as represented by vector 11 in FIG. 4.

Polarizer 3 may, by way of example, be a wire grid polarizer (Applied Optics, volume 4, Number 8, August 1965, page 1023). The transmission axis of the polarizer is also oriented at 45° with respect to the reference axes. Thus, light represented by vector 11, polarized at 45° with respect to the reference axes, is passed by the polarizer and comprises light beam 12.

Figure 5:
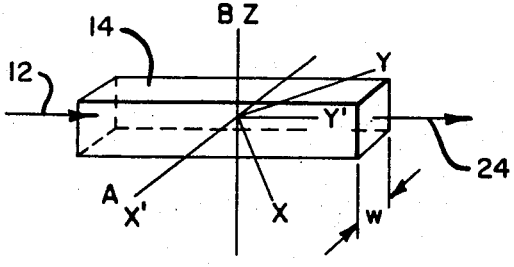
FIG. 5 is a perspective view of the modulator crystal illustrating the orientation thereof.

Optical modulator 4 may, by way of example, be a Pockels-effect modulator comprising an electro-optic crystal 14 such as a gallium arsenide crystal. The modulator has a prescribed length $L_m$ and width $w$. The crystal is oriented with its Z-axis parallel to the B-reference axis and its X and Y axes oriented at 45° with respect to the A-reference axis as illustrated in FIG. 5. (The A, X and Y axes are in the same plane.) Thus, the X and Y axes are oriented at 45° with respect to the direction of propagation of light beam 12.

Figure 3:
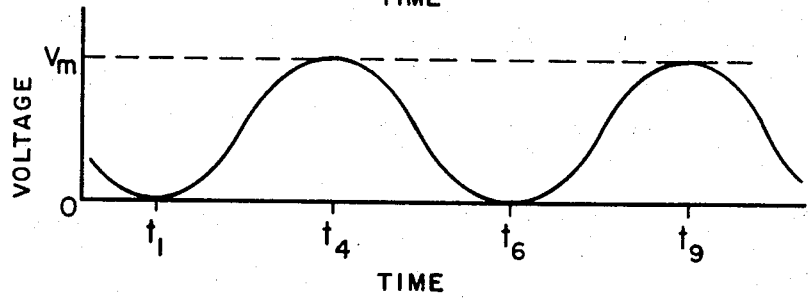
FIG. 3 is a waveform representing the output of the modulation voltage source.

Electrodes 15 and 16 made of electrically conductive material are secured to opposite sides of the crystal. The electrodes are electrically connected through the associated lines 19 and 20 to source 21 of modulation voltage. Source 21 comprises a radio frequency oscillator producing a sinusoidal modulation voltage. The modulation frequency is 50 mHz. for the pulse reference interval noted above. A DC bias voltage is also applied to the crystal by source 21 so the modulation voltage varies between zero volts and a maximum voltage $V_m$ (FIG. 3). The pulse repetition frequency and the modulation frequency of source 21 are synchronized so the modulation voltage is zero (FIG. 3, time $t_1$) when light pulses 6 produced by laser 1 strike the modulator. Thus, the polarization of light pulses 6 comprising light beam 12 is not changed by passage through the modulator. When the modulation voltage is maximum (FIG. 3, time $t_4$) the crystal develops axes X′ and Y′ of induced birefringence (FIG. 5) which are parallel to the A-reference axis and the direction of propagation of light beam 12, respectively. The indices of refraction associated with the X′ and Z axes are $$\eta_0 - \frac{1}{2} \eta_0^3 r_{41} \frac{V_m}{w}$$

and $\eta_0$, respectively, where $\eta_0$ is the ordinary index of refraction of the crystal and $r_{41}$ is the electrooptic coefficient of the crystal. The X′ axis is oriented at −45° with respect to the transmission axis of the polarizer.

Laser 2 is spaced a prescribed distance $L_s$ is automatically synchronized with the modulation frequency to produce pulses 10 of light (FIG. 2, time $t_2$). Lasers 1 and 2 are of course synchronized so that the respective light pulses 6 and 10 therefrom are offset by the time interval $t_1$ to $t_2$ (FIG. 2) required for light pulses 6 to travel from laser 1 to laser 2.

In operation, laser 1 produces a train of light pulses. Since the polarization of the output 5 of laser 1 (vector 11) is parallel to the transmission axis of the polarizer, light pulses 6 are passed to the modulator. When pulses 6 are incident on the modulator the modulation voltage is zero so that the pulses are passed without changing the polarization thereof. Light pulses 6 are incident on laser 2 at time $t_2$ (FIG. 2).

Figure 6:
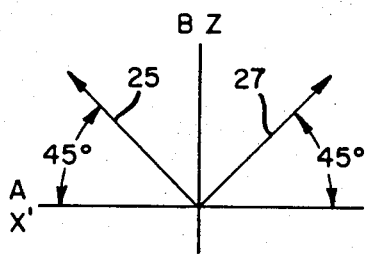
FIG. 6 is a vector diagram illustrating the operation of the invention.

Laser 2 is responsive to the injected light pulses 6 comprising light beam 24 for locking lasers 1 and 2 for producing light beam 9 comprising high power light pulses 10. Laser 2 also produces the light beam 9′ traveling toward the low-power laser 1. Since lasers 1 and 2 are phase locked, the polarization of light pulses 10 comprising the outputs of laser 2 is equal to the polarization of light beam 24 and therefore the polarization of light pulses 6. The polarization of light pulses 10 is represented by vector 25 (FIG. 6). It is desirable to block from laser 1 the light pulses 10 comprising light beam 9′.

The spacing $L_s$ between laser 2 and the modulator is such that the light pulses 10 comprising light beam 9′ are incident on the modulator when the modulation voltage is maximum (FIG. 2, time interval $t_3$ to $t_5$). The length $L_m$ and width $w$ of the modulator and the peak modulation voltage $V_m$ are adjusted so the polarization of these light pulses 10 is rotated −90° by passage through the modulator. The modulation voltage must satisfy the relationship $$V_m = \frac{\lambda}{\eta_0^3 r_{41}} \frac{w}{L_m}$$

where $\lambda$ is the wavelength of the frequency of the light. For the $CO_2$ laser, $\lambda = 10.6 \times 10^{-6}$ cm., and $$\eta_0^3 r_{41} = 5.9 \times 10^{-9} \text{ cm./volt}$$

Thus, for a crystal having a length $L_m = 2$ cm. and width $w = 0.2$ cm. (length to width ratio of 10), the modulation voltage $V_m$ must be approximately 180 volts. The polarization of the light beam 26 from the modulator is represented by vector 27 (FIG. 6). Since the polarization of light beam 26 (vector 27) and the transmission axis (vector 11) of the polarizer are crossed, back scattered light is blocked from laser 1 by the polarizer.

Although this invention is described in relation to a preferred embodiment thereof, modification will be apparent to those skilled in the art without departing from the principle of the invention. For example, this invention is not restricted to the use of any specific type of laser nor is it limited to a particular frequency range. It is only necessary to have one pulsed laser and want to lock it to another laser. Nor is this invention limited as to the type of polarizer that may be employed in practicing the invention. Also, there is no restriction as to the mechanism required to pulse the first laser. The electrooptic crystal may also be oriented with the applied field parallel to the direction of propagation of the incident light beam and may be other than a cubic crystal. The type of crystal employed is determined by the operating frequency of the system. Further, the modulator signal may be a pulse voltage rather than a sinusoidal voltage.

What is claimed is:
1. An optical isolator for passing to a second network a light pulse generated by a first network and blocking from the first network a light pulse from the second network, at least part of said light from the first network being polarized at a first angle, comprising
    means responsive to light from the first network for passing light polarized at said first angle and blocking from said first network light propagating toward the first network and polarized at a second angle orthogonal to said first angle, and
    a single electro-optic means responsive to light propagating in one direction from said first named means for shifting the polarization thereof through a third angle including 0° and responsive to light from the second network for shifting the polarization of the latter through a fourth angle, the magnitudes of said third and fourth angles being selected to cause the output of said last named means that is propagating in the opposite direction to be polarized at the second angle.
2. The system according to claim 1 wherein the magnitude of said third angle is 0° and said last named means comprises
    an electro-optic modulator, and
    a source of modulation voltage which periodically varies between first and second values, said source being electrically connected to said modulator, the recurrence frequency of light pulses and the frequency of the modulation voltage being synchronized so that the modulation voltage has said first value when a light pulse from said first network is incident on said modulator for passing said first light pulse without changing the polarization thereof and so the modulation voltage has said second value when a light pulse from said second network is incident on said modulator for rotating by 90° the polarization of the light pulse from said second network.
3. The system according to claim 2 wherein said first named means is a polarizer having a transmission axis parallel to said first angle for blocking from said first network light from said modulator polarized orthogonally to said first angle.
4. In combination with a pair of phase locked lasers wherein a first laser produces a first train of light pulses propagating along a prescribed path and a second laser is responsive to said first light pulses for producing a second train of light pulses propagating along the prescribed path, a network for optically isolating said lasers along the prescribed path comprising
    a polarizer positioned along the prescribed path and having a transmission axis, an electro-optic modulator positioned along the prescribed path to receive light from said polarizer and said second laser, said polarizer being positioned with respect to said first laser and said modulator for passing light pulses from said first laser polarized in a direction parallel to said transmission axis, and a source of modulation voltage periodically varying between first and second values, said source being electrically connected to said modulator, the repetition frequency of said light pulses and the frequency of the modulation voltage being synchronized so that said modulator is simultaneously responsive to first light pulses passed by said polarizer and the first value of said modulation voltage for shifting the polarization thereof through a first angle including 0°, and is simultaneously responsive to the second light pulses and the second value of said modulation voltage for shifting the polarization of said second light pulses through a second angle, the magnitudes of said first and second angles being selected to rotate by 90° the polarization of said second light pulses with respect to said first light pulses, said polarizer blocking from said first laser light polarized orthogonally to said transmission axis.

5. The optical isolator according to claim 4 wherein the first and second values of the modulation voltage from said source cause the magnitudes of the first and second angles to be 0° and 90°, respectively.

References Cited

UNITED STATES PATENTS

| | | | |
|---|---|---|---|
| 3,277,392 | 10/1966 | Nicolai | 331—94.5 |
| 3,277,393 | 10/1966 | Nicolai | 331—94.5 |
| 3,292,102 | 12/1966 | Byrne | 331—94.5 |
| 3,429,637 | 2/1969 | Wentz. | |

OTHER REFERENCES

"Laser Focus," vol. 1, No. 4, p. 7, February 1965.

DAVID SCHONBERG, Primary Examiner

P. R. MILLER, Assistant Examiner

U.S. Cl. X.R.

331—94.5; 350—151, 157